April 25, 1961  A. G. KAPLAN  2,981,339
RETRACTABLE PROPELLER
Filed May 12, 1960  3 Sheets-Sheet 2
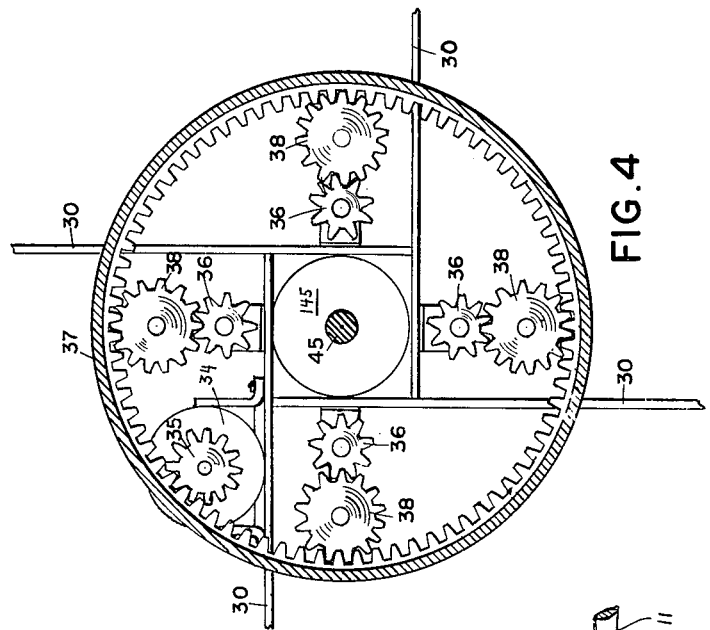
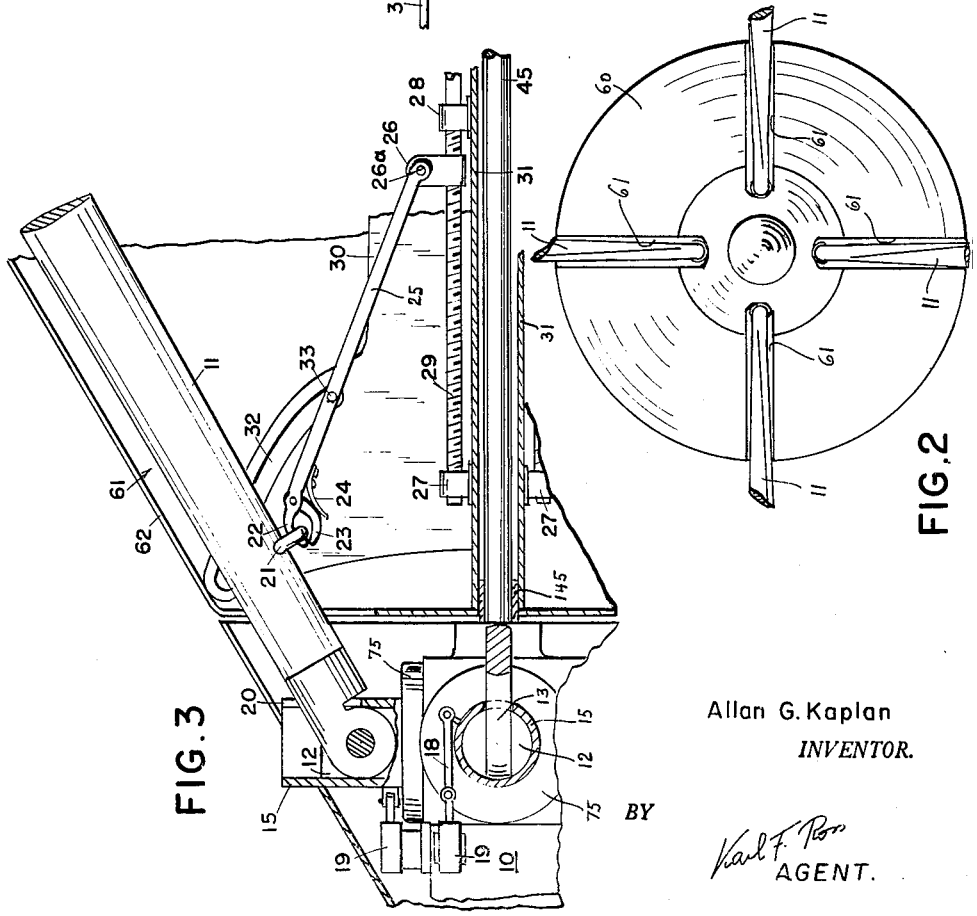
Allan G. Kaplan
INVENTOR.
BY
Karl F. Ross
AGENT.

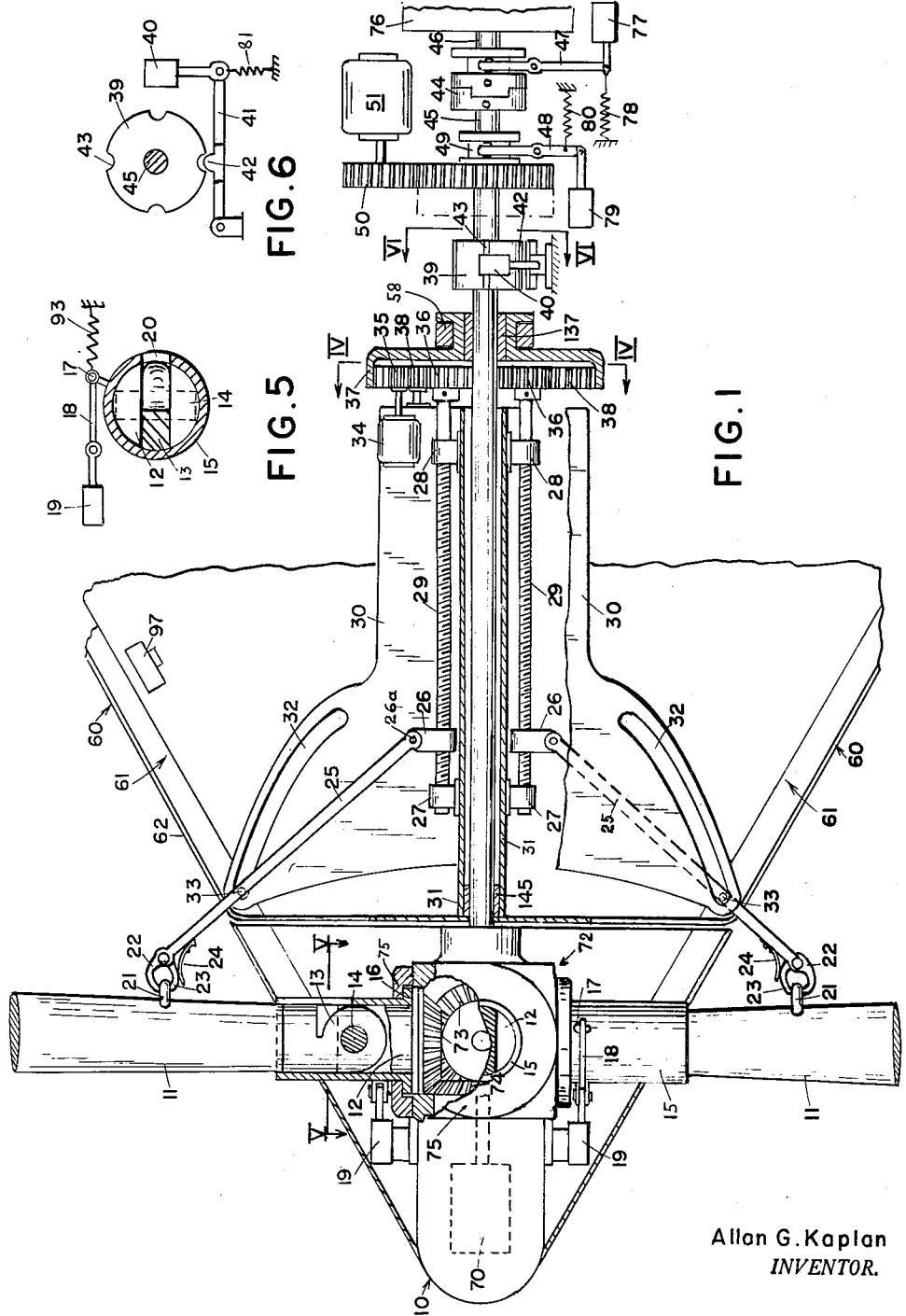

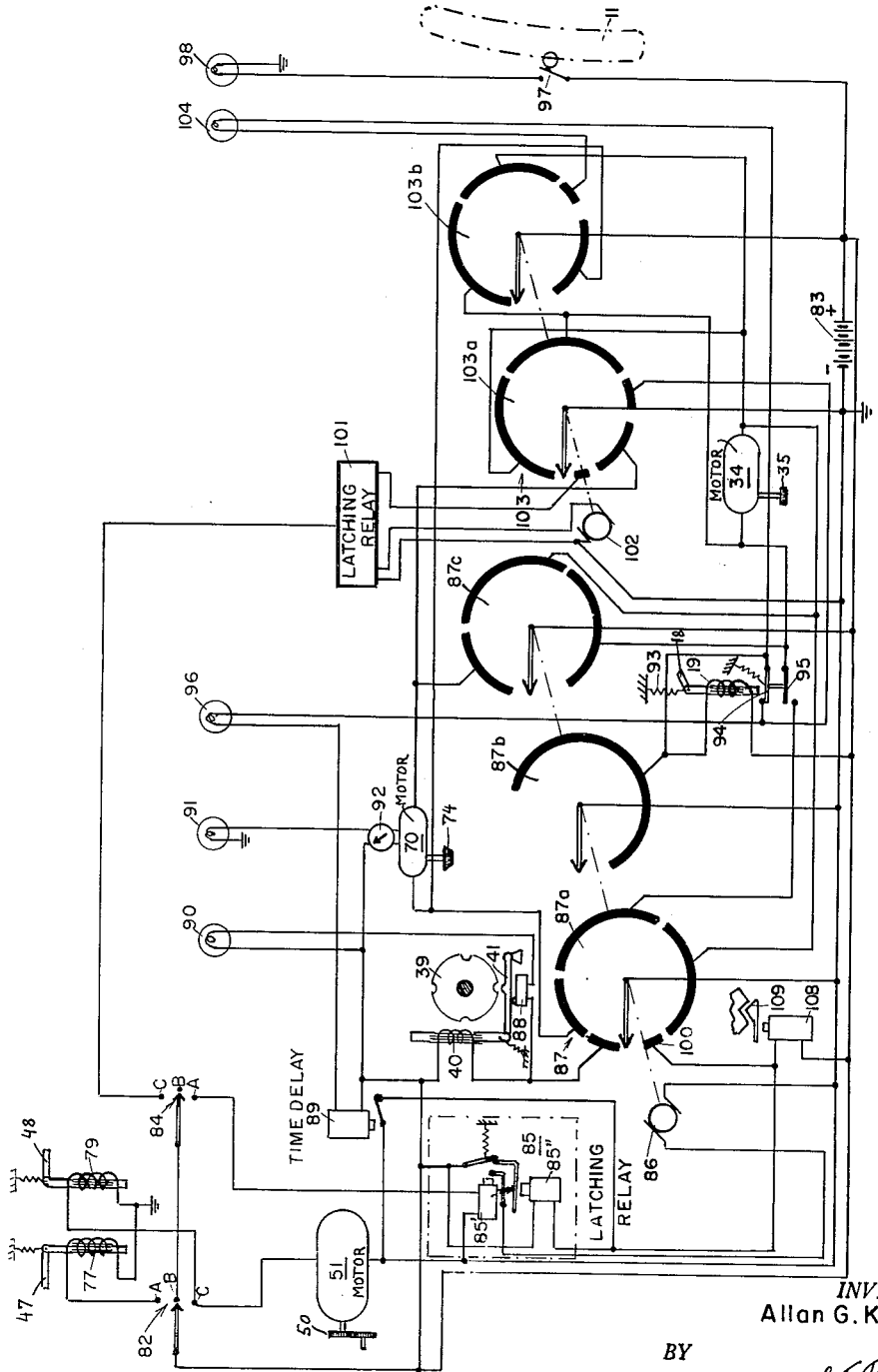

2,981,339
RETRACTABLE PROPELLER
Allan G. Kaplan, 861 E. 27th St., Paterson, N.J.
Filed May 12, 1960, Ser. No. 28,765
8 Claims. (Cl. 170—160.12)

My present invention relates to a retractable propeller.

Vehicles (e.g. airplanes and ships) adapted to travel through a fluid have hitherto been driven by the thrust of propellers and/or reaction-type (jet or rocket) engines. It has been suggested, heretofore, to equip jet- or rocket-propelled aircraft with one or more fixed-blade propellers whose thrust, in place of or in addition to that of the jet or rocket engine, would provide a measure of security against the failure (flame-out) of such engines and would permit a reduction of the take-off and landing velocities of these aircraft to accommodate them to relatively short landing strips which would normally be overshot by jet- and rocket-propelled planes. When the aforementioned fixed-blade propellers are inoperative, however, they are found to exert considerable drag during powered flight. Fixed-blade propellers for gasoline-powered air and sea craft also exert a drag, even when the blades thereof are feathered, if, for any reason, the propeller must be halted while the vehicle is in motion.

It is the principal object of this invention to provide a propeller whose blades are retractable into a housing, and means for withdrawing the blades into the housing.

It is another object of the invention to provide means for automatically retracting the blades of an airplane propeller into the nacelle thereof and for restoring the blades to their operative position.

It is still another object of my invention to provide an auxiliary propeller for jet- or rocket-propelled craft whose blades are withdrawable into a housing in order to reduce drag during normal operation and to be elevated to their operating positions when the propeller is employed as a supplemental or alternative source of thrust, e.g. during flight at reduced speed or upon failure of the reaction-type engine.

A further object of the invention is to provide a retractable-blade propeller which may be selectively driven either by the primary engine of a vehicle to supplement its thrust or by an auxiliary source of power when the primary engine is incapacitated.

According to a feature of my invention, I provide the cowling of a nacelle supporting a propeller spinner with a plurality of slots each adapted to receive a blade of the propeller. The blades are hingedly connected to the spinner for swinging motion in axial planes aligned with their respective openings, locking means being provided to assure that the blades will not swing from their erected position during operation of the propeller.

According to a more specific feature of the invention, I provide indexing means adapted positively to align each blade with one of the aforementioned slots prior to their retraction into the cowling. The retracting means may include individual grippers adapted to engage each of the blades when the latter are in their operating or extended position and to draw them through the slots in order to retract the blades; the grippers are actuated by a reversible mechanism so that the blades may be restored to their operative positions.

In accordance with yet another feature of the present invention, the blades of a variable-pitch propeller are rotated to their feathered positions in order to place suitable anchors on their stems in a position in which they are engageable by the grippers for retraction into the nacelle. The locking means may then comprise a sleeve having an axially extending cut adapted to pass the blade stem when the latter, in its feathered position, is aligned with the cut, the sleeve being rotatable to a locking position in a direction opposite to that of the blade when the latter is returned from feathered to forwardly pitched position.

I have also found it advisable to provide automatic means for retracting and spreading the propeller and for indicating a failure in the retraction mechanism, as well as means for interrupting the retracting squence in response to a malfunction and re-establishing it after such malfunction has been corrected.

The above and other objects, features and advantages of the present invention will become more readily apparent from the following description of a specific embodiment of the invention, reference being made to the accompanying drawing in which:

Fig. 1 is an axial cross-sectional view of a propeller, spinner and nacelle assembly according to the invention;

Fig. 2 is a front-elevational view of an aircraft embodying the retractable propeller of Fig. 1;

Fig. 3 is a detail view of a portion of Fig. 1;

Fig. 4 is a cross-sectional view taken along line IV—IV of Fig. 1;

Fig. 5 is a cross-sectional view taken along line V—V of Fig. 1;

Fig. 6 is a cross-sectional view taken along line VI—VI of Fig. 1; and

Fig. 7 is a schematic circuit arrangement for the control and actuation elements of the retraction device for the propeller blades.

In the drawing I show the nacelle 60 of an airplane whose cowling 62 is provided with four slots 61, each of these slots being adapted to receive a blade 11 of a propeller. Each blade 11 is pivoted between two limbs of a bifurcated stud 12 by a pin 14 passing through its lower extremity 13. The stud 12 is journaled in a differential housing 72 of the propeller spinner 10 and carries a bevel gear 73. The bevel gears 73 of the four studs 12 mesh with another bevel gear 74 which is connected to a motor 70 adapted, in response to a signal from the pilot, to vary the pitch of the propeller blades 11. A locking sleeve 15 surrounds the stem 13 of each propeller blade 11 and its bifurcated stud 12, the sleeve extending beyond the latter to lock the propeller blade 11 in its radially extended position. The locking sleeve 15 is rotatable within a mounting ring 75 and is provided with a cut 20 whose width is sufficient to pass the stem 13 of blade 11 in its feathered orientation. A solenoid 19, adapted to rotate the locking sleeve 15, is linked therewith by a bar 18 which is pivoted to the solenoid armature and to a pin 17 secured to the sleeve.

The propeller spinner 10 is rigidly affixed to a drive shaft 45, journaled in the nacelle 60, which carries one member of a clutch 44 adapted to interconnect the drive shaft 45 with a shaft 46 which is rotated by the primary engine 76 of the craft. This engine may, of course, be of any conventional type (e.g. turbine or piston). The clutch 44 is acutated by an arm 47 which is coupled to the armature of a solenoid 77. A spring 78 biases the arm 47 to maintain the clutch 44 in its disengaged position until the solenoid 77 is actuated. Shaft 45 also carries a gear 49 which is keyed thereto for axial displacement into and out of engagement with a spur gear 50 driven by an auxiliary power source such as an electric motor 51. A shifting arm 48, adapted to displace the gear, is connected to the armature of a solenoid 79 and is biased by a spring 80 to maintain gear 49 out of mesh with gear 50 unless the solenoid is actuated.

An indexing and braking drum 39 (best seen in Fig. 6) is rigidly secured to the drive shaft 45 and is provided with four notches 43, each corresponding to one of the blades 11. A solenoid 40 is actuatable to urge a braking and indexing bar 41 against the drum 39 so that a protuberance 42 of the bar 41 may enter one of the notches 43, thereby aligning the blades 11 with their respective slots 61 in the nacelle 60. A spring 81 normally biases the bar 41 out of engagement with the drum 39.

The retracting means comprises four arms 25 carrying releasable grippers upon one extremity thereof. Each gripper includes a fixed finger 22 and a pivotable finger 23 which is urged toward the fixed finger 22 by a leaf spring 24. The two fingers 22 and 23 are adapted to engage an eye 21 upon each of the blades 11. Each arm 25 is rotatably joined, at its other extremity, to an internally threaded block 26 by a pin 26a and is provided, intermediate the extremities, with a roller 33 which is guided in a channel 32 of a guide plate 30. The several guide plates are carried by support blades 31 which also carry the pillow blocks 27 and 28. A lead screw 29 is threaded into each block 26 between a pair of pillow blocks 27 and 28 wherein the lead screw is journaled. Each lead screw 29 is provided with a gear 36 (Fig. 4) in mesh with an idler gear 38, journaled to each guide plate 30, which, in turn, meshes with an internal gear 37, journaled on the shaft 45 via a bearing 137. A motor 34, adapted to drive the retraction mechanism, is provided with a gear 35 in mesh with the internal gear 37. Shaft 45 is lodged in a fixed bearing 145 at one end, its other end being supported via bearing 137 by gear 37 which in turn is journaled in a fixed bearing 58.

In Fig. 7 I show a circuit arrangement for the retraction mechanism. The contact arm of a three-pole switch 82 is connected to one terminal of a battery 83, or other source of electrical energy, whose other terminal is grounded. When the arm of switch 82 is in position 82A, a circuit is closed between the solenoid 77 and ground, to close the clutch 44 and to couple the drive shaft 46 of the primary engine 76 with the shaft 45 of the propeller which is assumed to be in its erected position. The engine 76 applies torque to the propeller whose pull supplements the reaction thrust of the engine. In position 82C of the switch 82, the solenoid 79 and the auxiliary motor 51 are energized so that this motor may drive the propeller. Spring 78, concurrently, has reopened the clutch 44 to disconnect the primary engine from the propeller shaft 45. In position 82C of switch 82, the aircraft is wholly driven by the auxiliary motor 51 (e.g. for landing, take-off, and in case of primary-engine failure), the main jet engine being cut off to conserve fuel and to reduce speed.

In the intermediate position 82B of the switch 82, the retracting mechanism may be energized by a second switch 84, in series with switch 82, whose three positions 84A, 84B and 84C correspond respectively to the functions "retract," "off" and "open." When switch 84 is momentarily shifted to the "retract" position 84A, the latching coil 85′ of a relay 85 closes a circuit to activate the timer motor 86 of a sequence switch 87. The wipers of switch levels 87a and 87b are returned to ground while that of level 87c is connected to the positive terminal of battery 83. The clockwise rotation of the wipers from their inactive positions first closes a circuit through the solenoid 40 in order to brake and to index the rotating propeller shaft 45 whose rotation continues for a while under the momentum of the propeller after the switch 82 has released the solenoids 77 and 79 to disconnect the shaft 45 from both the motor 51 and the primary engine 76.

The wiper of switch level 87a simultaneously closes a circuit through a normally closed microswitch 88 which bears on the bar 41; this circuit also extends through the winding of a time-delay relay 89 adapted to open the circuit to the retraction mechanism by activating the unlatching coil 85″ of relay 85 if, after a period normally sufficient to insure the arrest of shaft 45, the protuberance 42 has not entered one of the notches 43 in drum 39 to permit microswitch 88 to open. Thus, if the propeller is not halted in an angular position in which its blades 11 are aligned with the slots 61, the retraction sequence is suspended whereupon the operator may, through the manipulation of switches 82 and 84, recommence the sequence. A pilot lamp 90 on the instrument panel (not shown) of the vehicle lights at the start of the retraction sequence and remains lit until the blades 11 are properly oriented, thereby indicating to the operator the successful completion of the first step.

Subsequently, the wipers of switch levels 87a and 87c engage respective segments of their contact arcs to close a circuit to the motor 70 which varies the pitch of the blades 11. When the latter are feathered, as indicated by the lamp 91 and the pitch indicator 92, the wiper of level 87b closes a circuit to energize the solenoid 19, thereby rotating the locking sleeve 15 to its open position against a restoring spring 93. The solenoid 19 also acts upon the armatures of a pair of switches 94 and 95. Switch 94, normally closed, is serially included in a circuit interconnecting the battery 83, an indicator lamp 96 and the time-delay relay 89, whereby the indicator lamp 96 lights when the solenoid 19 is energized and the time-delay relay 89 is activated so that, if after a predetermined duration subsequent to such energization the solenoid 19 does not operate to rotate the locking sleeve 15 to its open position and to open the switch 94 the retraction mechanism will be halted as previously described. As the locking sleeve 15 reaches its open position, the other switch 95, normally open, closes so that a circuit is completed via levels 87a and 87c of switch 87 to the motor 34, thereby driving the lead screws 29 to move the threaded blocks 26 from their extreme right-hand positions to the left (as viewed in Figs. 1 and 3). Arms 25 are now guided upwardly and outwardly to engage the eyes 21 of the respective blades 11.

Continued rotation of the sequence switch 87 then reverses the direction of motor 34, thus displacing the blocks 26 to the right to retract the blades through the slots 61. As the blades clear the slots, a switch 97 is tripped to light an indicator lamp 98 to denote successful completion of the retraction. The wiper of switch level 87a then brushes a homing and cut-off contact 100 which grounds the unlatching coil 85″ of relay 85 and energizes a relay 108 to trip a latching pawl 109, thereby restoring the sequence switch 87 to its initial position.

The propeller blades 11 may be returned to their extended positions by manually shifting switch 84 to its "open" position 84C, thereby closing the latching relay 101, which is similar to relay 85, to activate the motor 102 of the sequence switch 103. The wipers of levels 103a and 103b of switch 103 again close a circuit to the motor 34 to move the blocks 26 to the left and to raise the blades 11 to their erected position, whereupon the springs 93 rotate the locking sleeves 15 out of alignment with the feathering positions of the blades. Motor 34 is then reversed to disengage the grippers of arms 25 from the eyes 21 of the blades 11 and to withdraw the arms 25 through the openings 61 to their rest position.

An indicator lamp 104, connected in a circuit including switch 94 and an arc segment of each level 103a, 103b, lights when the sleeves 15 have locked and before the motor 70 is operated to restore the blades 11 of the propeller to forward pitch. It will be apparent that the solenoid 19 illustrated in Fig. 7 is representative of four solenoids connected in parallel, each of which is associated with one blade 11. Switch 82 may then be shifted to its position 82A, wherein the primary engine 76 drives the propeller, or to its position 82C, wherein auxiliary motor 51 is coupled with the propeller shaft.

The invention illustrated and described admits of many modifications and variations within the ability of persons

I claim:

1. In a vehicle, in combination, a propeller shaft provided with a hub, a plurality of blade supports extending laterally from said hub in a common plane transverse to the shaft axis, said supports being rotatable about respective radial axes, pitch-control means coupled with said supports for rotating same in unison about said radial axes, a plurality of propeller blades respectively mounted on said supports with freedom of swinging movement in respective axial planes of said shaft, said pitch-control means being adapted to rotate all of said blades in unison, a locking member at each of said supports rotatable about the respective radial axis and normally positioned to maintain the respective propeller blade radially erect on said shaft, means for rotating said locking members relatively to said supports into an off-normal position clearing said blades for said swinging movement, and actuating means for simultaneously withdrawing said blades into substantial parallelism with said shaft axis.

2. In a vehicle, in combination, a propeller shaft provided with a hub, a plurality of blade supports extending laterally from said hub in a common plane transverse to the shaft axis, said supports being rotatable about respective radial axes, pitch-control means coupled with said supports for rotating same in unison about said radial axes, a plurality of propeller blades respectively mounted on said supports with freedom of swinging movement in respective axial planes of said shaft, said pitch-control means being adapted to rotate all of said blades in unison into a feathered position, locking means at each of said supports normally positioned to maintain said blades radially erect on said shaft but positionable to clear said blades for said swinging movement in the feathered position thereof, and actuating means for simultaneously withdrawing said blades into substantial parallelism with said shaft axis, said locking means comprising an independently rotatable sleeve surrounding each of said supports, said sleeve being provided with a cut dimensioned and positioned to pass the corresponding blade in its feathered position only.

3. In a vehicle, in combination, a propeller shaft provided with a hub, blade-supporting means extending laterally from said hub, blade means pivotally secured to said blade-supporting means for swinging movement between an erected position normal to said shaft and a retracted position substantially parallel thereto, locking means on said hub normally maintaining said blade means in said erected position but positionable to clear said blade means for movement out of said erected to said retracted position, anchor means on said blade means, and gripper means reversibly displaceable relatively to said blade means for engaging said anchor means and withdrawing said blade means from said erected to said retracted position.

4. In a vehicle, in combination, a propeller shaft provided with a hub, blade-supporting means extending laterally from said hub, blade means pivotally secured to said blade-supporting means for swinging movement between an erected position normal to said shaft and a retracted position substantially parallel thereto, said blade-supporting means being rotatable on said hub about a perpendicular axis for rotation between an operatively pitched and a feathered orientation of the erected blade means, locking means on said hub normally maintaining said blade means in said erected position but positionable to clear said blade means for movement out of said erected to said retracted position upon a feathering said blade means while preventing such movement with any other orientation of said blade means, anchor means on said blade means facing rearwardly upon a feathering thereof, and gripper means reversibly displaceable relatively to said blade means for engaging said anchor means and withdrawing said blade means from said erected to said retracted position.

5. In a vehicle, in combination, a propeller shaft provided with a hub, a plurality of blade supports extending laterally from said hub in a common plane transverse to the shaft axis, said supports being rotatable about respective radial axes, pitch-control means coupled with said supports for rotating same in unison about said radial axes, a plurality of propeller blades respectively mounted on said supports with freedom of swinging movement in respective axial planes of said shaft, said pitch-control means being adapted to rotate all of said blades in unison into a feathered position, locking means at each of said supports normally positioned to maintain said blades radially erect on said shaft but positionable to clear said blades for said swinging movement in the feathered positions thereof, each of said blades being provided with a projection facing rearwardly in the feathered position thereof, and a plurality of gripper arms mounted rearwardly of said hub for reversible movement along said shaft axis and adapted releasably to engage the projections on said blades upon alignment of the latter with said arms for withdrawing said blades into substantial parallelism with said shaft axis.

6. In an aircraft, in combination, a thrust engine adapted to power the aircraft in flight, a propeller shaft provided with a hub, a plurality of blade supports extending laterally from said hub in a common plane transverse to the shaft axis, said supports being rotatable about respective radial axes, pitch-control means coupled with said supports for rotating same in unison about said radial axes, a plurality of propeller blades respectively mounted on said supports with freedom of swinging movement in respective axial planes of said shaft, said pitch-control means being adapted to rotate all of said blades in unison into a feathered position, locking means at each of said supports normally positioned to maintain said blades radially erect on said shaft but positionable to clear said blades for said swinging movement in the feathered positions thereof, each of said blades being provided with a projection facing rearwardly in the feathered position thereof, a plurality of gripper arms mounted rearwardly of said hub for reversible movement along said shaft axis and adapted releasably to engage the projections on said blades upon alignment of the latter with said arms for withdrawing said blades into substantial parallelism with said shaft axis, reciprocating means for so moving said gripper arms, drive means for rotating said shaft, coupling means selectively operable to connect said drive means with said shaft, indexing means engageable with said shaft upon disconnection thereof from said drive means for aligning said projections with said arms, and mechanism for actuating, in a reversible sequence, said indexing means, said reciprocating means, said locking means, said pitch-control means and said coupling means for temporarily rendering said blades effective to propel the aircraft.

7. The combination according to claim 6 wherein said drive means includes an auxiliary engine, said coupling means being selectively operable to connect said shaft with either of said engines.

8. The combination according to claim 6, further comprising a nacelle surrounding part of said shaft rearwardly of said hub, said nacelle being provided with slots lying in axial planes of said shaft, said gripper arms being aligned with said slots for passing said blades therethrough upon erection and withdrawal of the latter.

References Cited in the file of this patent

UNITED STATES PATENTS

| | | |
|---|---|---|
| 123,733 | Schmidt | Feb. 13, 1872 |
| 1,436,850 | Aylesworth | Nov. 28, 1922 |
| 1,456,008 | Nuanes | May 22, 1923 |
| 1,496,723 | Miller | June 3, 1924 |
| 1,867,473 | Purser | July 12, 1932 |
| 2,498,140 | Stalker | Feb. 21, 1950 |